United States Patent
Yang et al.

(10) Patent No.: US 7,421,495 B2
(45) Date of Patent: Sep. 2, 2008

(54) SYSTEM AND METHOD FOR MONITORING NETWORK DEVICES

(75) Inventors: Fang Yang, S. Setauket, NY (US); Sung-Joon Moon, Flushing, NY (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 10/759,704

(22) Filed: Jan. 15, 2004

(65) Prior Publication Data

US 2004/0267924 A1 Dec. 30, 2004

Related U.S. Application Data

(60) Provisional application No. 60/483,520, filed on Jun. 27, 2003.

(51) Int. Cl.
G06F 15/173 (2006.01)
G06F 7/00 (2006.01)

(52) U.S. Cl. .................. 709/224; 709/217; 709/219; 709/223; 709/229; 709/243; 709/244; 707/1; 707/2; 707/3; 707/4; 707/5; 707/6; 707/7; 707/8; 707/9; 707/10

(58) Field of Classification Search ............... 707/1–10; 709/217, 223, 224, 229, 243, 244, 219
See application file for complete search history.

(56) References Cited

U.S. PATENT DOCUMENTS

| | | | |
|---|---|---|---|
| 5,696,486 A | 12/1997 | Poliquin et al. | |
| 5,819,028 A | 10/1998 | Manghirmalani et al. | |
| 5,974,237 A | 10/1999 | Shurmer et al. | |
| 5,974,457 A | 10/1999 | Waclawsky et al. | |
| 5,999,179 A * | 12/1999 | Kekic et al. | 715/734 |
| 6,061,724 A | 5/2000 | Ries et al. | 709/224 |
| 6,128,016 A * | 10/2000 | Coelho et al. | 715/808 |
| 6,243,756 B1 | 6/2001 | Whitmire et al. | |
| 6,327,677 B1 | 12/2001 | Garg et al. | |
| 6,370,572 B1 | 4/2002 | Lindskog et al. | |
| 6,510,454 B1 | 1/2003 | Walukiewicz | |
| 6,642,946 B1 * | 11/2003 | Janes et al. | 715/854 |
| 6,697,963 B1 * | 2/2004 | Nouri et al. | 714/31 |
| 2002/0075297 A1 | 6/2002 | Boulter | 345/736 |
| 2003/0200473 A1 * | 10/2003 | Fung | 713/320 |
| 2003/0208480 A1 * | 11/2003 | Faulkner et al. | 707/3 |
| 2004/0039745 A1 * | 2/2004 | Evans et al. | 707/100 |
| 2007/0208669 A1 * | 9/2007 | Rivette et al. | 705/59 |

OTHER PUBLICATIONS

U.S. Appl. No. 60/377,708.*
International Search Report dated May 31, 2005 issued in counterpart International Application No. PCT/US04/20745; 6 pages.

* cited by examiner

*Primary Examiner*—Nathan J. Flynn
*Assistant Examiner*—Ashok Patel
(74) *Attorney, Agent, or Firm*—Pillsbury Winthrop Shaw Pittman, LLP (57) ABSTRACT

A method and system for monitoring hardware information associated with a network device in an enterprise system are provided. In one embodiment, a method for monitoring hardware information associated with a network device in an enterprise system includes retrieving hardware information associated with a network element, the hardware information including information on one or more hardware characteristics. A display dynamically presents the information.

15 Claims, 7 Drawing Sheets

SYSTEM AND METHOD FOR MONITORING NETWORK DEVICES

RELATED APPLICATION

This application claims the priority under 35 U.S.C. §119 of provisional application Ser. No. 60/483,520 filed Jun. 27, 2003.

TECHNICAL FIELD

This disclosure relates generally to the field of networks, and more particularly to a system and method for monitoring network devices.

BACKGROUND

Communication networks rapidly convey large amounts of information typically in the form of frames or packets to remote points. Such networks may include a number of apparatuses such as switches, bridges, routers, computers, printers, servers, databases, or other such devices. Network management systems have become necessary to facilitate the management of communication systems especially as they have grown in size. Conventional management systems typically do not provide the ability to monitor hardware characteristics of a network device.

SUMMARY

A method and system for monitoring hardware information associated with a network device in an enterprise system are provided. In one embodiment, a method for monitoring hardware information associated with a network device in an enterprise system includes retrieving hardware information associated with a network element, the hardware information including information on one or more hardware characteristics. A display dynamically presents the information.

BRIEF DESCRIPTION OF THE DRAWINGS

FIG. 1 is a block diagram illustrating an exemplary communication system including a network monitoring system;

FIGS. 2A-E illustrate exemplary displays presenting example front-ends of the chassis monitoring engine referred to in FIG. 1; and FIG. 3 is an exemplary flow diagram illustrating an example method for monitoring hardware characteristics of a network device.

DESCRIPTION OF EXAMPLE EMBODIMENTS

FIG. 1 illustrates one embodiment of a monitoring system 100 that uses a graphical user interface to monitor hardware characteristics in a communication network. At a high level, communication system 100 includes a network 112 and a monitoring system 113 coupled via a link 116.

Network 112 communicates information between source and destination points. The sources and/or destinations may be in network 112 or external to the network. Within the network, information may be communicated on wireless and/or wireline links between network devices. Network 112 may include one or more subnetworks, LANs, radio access networks (RANs), metropolitan area networks (MANs), wide area networks (WANs), all or a portion of the global network known as the Internet, and/or any other communication system or systems at one or more locations. Network 112 may communicate, for example, Internet Protocol (IP) packets, frame-relaying frames, Asynchronous Transfer Mode (ATM) cells, voice, video, data, and other suitable information between network addresses. It will be understood that network 112 may comprise TCP/IP, IPX, SNA, DECNet, or other suitable networks.

In the illustrated embodiment, network 112 includes a plurality of subnetworks ("subnets") 134 and a plurality of network devices 118. Network devices 118 may include switches, routers, hubs, computers, printers, servers, data storage devices, or other suitable network devices. Furthermore, each network device 118 includes associated hardware characteristics. Hardware characteristics may include, where appropriate, chassis temperature, CPU usage, memory usage, fan status, module status, power supply status, a combination of the foregoing, or any other information associated with the physical characteristics of a network device 118. Subnets 134 comprise segments of network 112 coupled via bridging ports 136 of switches 124. Subnets 134 may include routers, bridges, switches, repeaters, computers, data storage devices, servers, and other devices operable to communicate in a communication network. Switches 124 are operable to pass traffic between subnets 134 over bridging ports 136. Bridging ports 136 may be any suitable type of wireline or wireless link capable of passing traffic between subnets 134. In one embodiment, bridging ports 136 include a wireline link capable of passing traffic between subnets 134, wherein subnets 134 include a plurality of LAN segments. Each subnet 134 may comprise the same or different topologies as other subnets 134, such as bus, ring, tree, star, or other suitable topologies operable to pass information between end stations.

Monitoring system 113 monitors network 112 over link 116. Link 116 may comprise any discrete wireless and/or wireline communication links or channels. Monitoring system 113 may query, receive data from, store configuration information and other data for and send communication to network 112. While monitoring system 113 is illustrated as disparate from network 112, network 112 may include monitoring system 113. Monitoring system 113 may comprise a plurality of devices operable to monitor other network devices 118 in network 112. For example, monitoring system 113 may comprise a plurality of monitoring computers. In the illustrated embodiment, monitoring system 113 includes monitoring computer 114.

Monitoring computer 114 includes graphical user interface (GUI) 122, network interface 132, a memory 120, and a processor 126. The present disclosure includes a flexible configuration file 128 and a polling configuration file 130 that may be stored in memory 120 and may be executed or processed by processor 126. FIG. 1 only provides one example of a computer that may be used with the disclosure. The present disclosure contemplates computers other than general purpose computers as well as computers without conventional operating systems. As used in this document, the term computer is intended to encompass a personal computer, a workstation, network computer, mainframe, or any other suitable processing device. Illustrated monitoring computer 114 executes Microsoft's Windows operating system, but this disclosure contemplates computer 114 may be adapted to execute any operating system including UNIX, Linux or other suitable operating systems.

GUI 122 comprises a graphical user interface operable to allow the user of monitoring computer 114 to monitor network 112. Generally, GUI 122 provides the user of monitoring computer 114 with an efficient user-friendly presentation of data provided by monitoring computer 114 or network 112. GUI 122 may comprise a plurality of displays having interactive fields and buttons operated by the user. In one example, GUI 122 presents an explorer-type interface and receives commands from the user. It should be understood that the term graphical user interface may be used in the singular or the plural to describe one or more graphical user interfaces in each of the displays of a particular graphical user interface. Furthermore, GUI 122 contemplates any graphical user interface that processes information in computer 114 and efficiently presents the information to the user.

Figure 1:
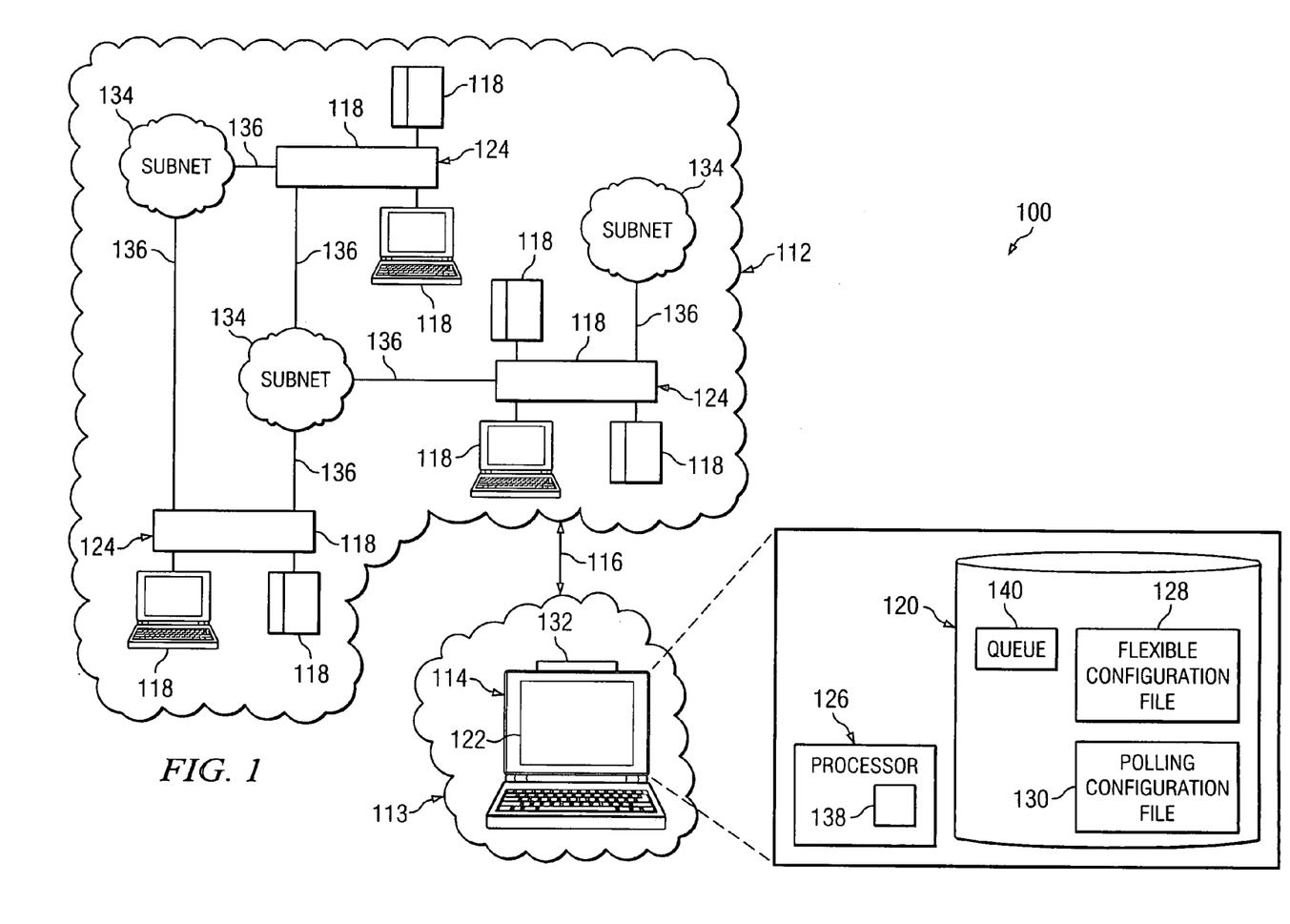

Network interface 132 may facilitate communication with network 112, including switches 124 in network 112. In certain embodiments, computer 114 may generate a request to at least one of the switches 124 in network 112 for information associated with the at least one of the switches 124. Interface 132 calibrates the transmission of these requests and the reception of responses to these requests. Generally, interface 132 comprising the logic encoded in software and/or hardware in a suitable combination and operable to communicate with network 112 via the link 116. More specifically, interface 132 may comprise software supporting one or more communications protocols associated with link 116 and network 112 hardware operable to communicate physical signals.

Memory 120 may include any memory or data base module and may take the form of volatile or nonvolatile memory including, without limitation, magnetic media, optical media, random access memory (RAM), read-only memory (ROM), removable media, or any other suitable local or remote memory or storage component. In the illustrated embodiment, memory 120 includes queue 140, flexible configuration file 128, and polling configuration file 130. Queue 140 provides temporary storage of the information associated with switches 124 for use by computer 114. In the illustrated embodiment, queue 140 is a first-in first-out queue. It will be understood computer 114 may store information associated with network 112 in any manner sufficient to provide computer 114 with the information.

Flexible configuration file 128 comprises instructions, algorithms, data mapping, or any other directive used by computer 114 to retrieve one or more Management Information Base (MIB) parameters from switches 124. Generally, an MIB is a database of management information maintained by a device or agent that has information about any suitable apparatus and may include the identity of the vendor, hardware characteristics, or other suitable information. Configuration file 128 generally includes information locating or referencing the chassis information in the corresponding MIB, thereby enabling chassis monitoring engine 138 to efficiently identify where to poll for finding specific information, such as memory usage or other information. Flexible configuration file 128 may also be modified to support other devices, if similar information is available in another MIB or another part of the MIB. Moreover, configuration file 128 may define the translation or data mapping to return results. For example, if "return result" is 1, then configuration file maps the value to OK; or if "return result" is 0, then configuration file maps the value to FAIL. This also gives the flexibility to map result to different value. In one embodiment, changing the configuration allows computer 114 to retrieve information associated with a different network device 118 and display this information through GUI 122. In this embodiment, flexible configuration file 128 provides directions to computer 114 such that MIB objects representing similar information may be retrieved from a corresponding MIB table associated with the different network device 118 and stored in a different location in the corresponding MIB table. File 128 is typically in a name/value pair format; but the disclosure contemplates that it may be of any suitable format including XML documents, flat files, comma-separated-value (CSV) files, Btrieve files, relational database tables, and others.

Polling configuration file 130 comprises rules, instructions or any other directive used by computer 114 to poll switches 124 in network 112. In one embodiment, polling configuration file 130 comprises different time intervals at which computer 114 polls a switch 124 to retrieve corresponding MIB parameters. The polling intervals may include time intervals associated with chassis alarms, temperature statue, fan status, power supply status, module status, process status, chassis CPU usage, process CPU usage, memory pool information, timeout, a combination of the foregoing, or any other information that may vary in time. File 130 is typically is name/value pair format; but the disclosure contemplates that it may be of any suitable format including XML documents, flat files, comma-separated-value (CSV) files, Btrieve files, relational database tables, and others.

Processor 126 executes instructions and manipulates data to perform operations of monitoring computer 114. Although FIG. 1 illustrates a single processor 126 in computer 114, multiple processors 126 may be used according to particular needs, and reference to processor 126 is meant to include multiple processors 126 where applicable. In the illustrated embodiment, computer 114 includes chassis monitoring engine 138, which transmits requests to network devices 118, processes the responses from network devices 118, and automatically, dynamically generates GUI 122 which may be based in part on input from the user. The term "automatically," as used herein, generally means that the appropriate processing is substantially performed by at least a portion of an automated system. The term "dynamically," as used herein, generally means that the appropriate processing is determined at run-time based upon the appropriate information. Such monitoring systems provide system administrators a better system for monitoring a physical status of network device 118 and eases the burden of analyzing root causes of physical component failure in networks. In one embodiment, processor 126 may perform one or more of the following functions: topology mapping for discovering and visualizing network 112 topology, fault management for detecting network 112 router and network device 118 problems, event management for correlating and intuitively displaying events, Virtual LAN (VLAN) management for managing VLAN configuration and subnet access, network troubleshooting for tracing and displaying link routes and speed, or any other suitable function for processing network 112 information.

Chassis monitoring engine 138 may use Simple Network Management Protocol (SNMP) to request MIB objects from switches 124 in network 112. SNMP requests are typically encoded into protocol data units (PDUs) and sent to the SNMP agent layer over IP. Chassis monitoring engine 138 receives, decodes, and filters SNMP get-responses PDUs from the agent and stores this information in memory 120. Chassis monitoring engine 138 may include any hardware, software, firmware, or combination thereof operable to request and process information associated with the network devices 118. It will be understood that while chassis monitoring engine 138 is illustrated as a single multi-task module, the features and functionality performed by this engine may be performed by multiple modules. Moreover, chassis monitoring engine may comprise a submodule of another application without departing from the scope of this disclosure.

In one aspect of operation, a user of computer 114 initializes chassis monitoring engine 138 and selects a switch 124 via GUI 122 for monitoring. Chassis monitoring engine 138 loads flexible configuration file 128 and determines the corresponding location of hardware characteristics located in an MIB table associated with the selected switch 124. Moreover, chassis monitoring engine 138 may retrieve, select, or otherwise access part of configuration file 128 for translation or data mapping of information used to translate the poll results. Chassis monitoring engine 138 loads polling information from polling configuration file 130 and transmits requests to the selected switch 124 for information associated with the selected switch 124, including hardware characteristics or any other suitable information. Chassis monitoring engine 138 receives, processes, and filters responses from the selected switch 124 and the processed information is stored in queue 140. Chassis monitoring engine 138 formats the information stored in queue 140 and dynamically constructs the presentation of the formatted information for GUI 122. Based upon the processed polling information, chassis monitoring engine 138 request updated information from the selected switch 124, which is processed by chassis monitoring engine 138 and stored in queue 140. Chassis monitoring engine 138 formats the information stored in queue 140 and updates GUI 122 based on the additional information.

FIGS. 2A-2E illustrates various embodiments of display 200 presented by a chassis monitoring engine 138. Generally, display 200 provides a frond-end for at least a portion of the processing by chassis monitoring engine 138. In other words, chassis monitoring engine 138 provides the user with a view of information associated with a selected switch 124 in network 112 via GUI 122. More specifically, chassis monitoring engine 138 provides a real-time, graphical view of hardware characteristics of the selected switch 124 in the enterprise network 112.

Figure 2A:
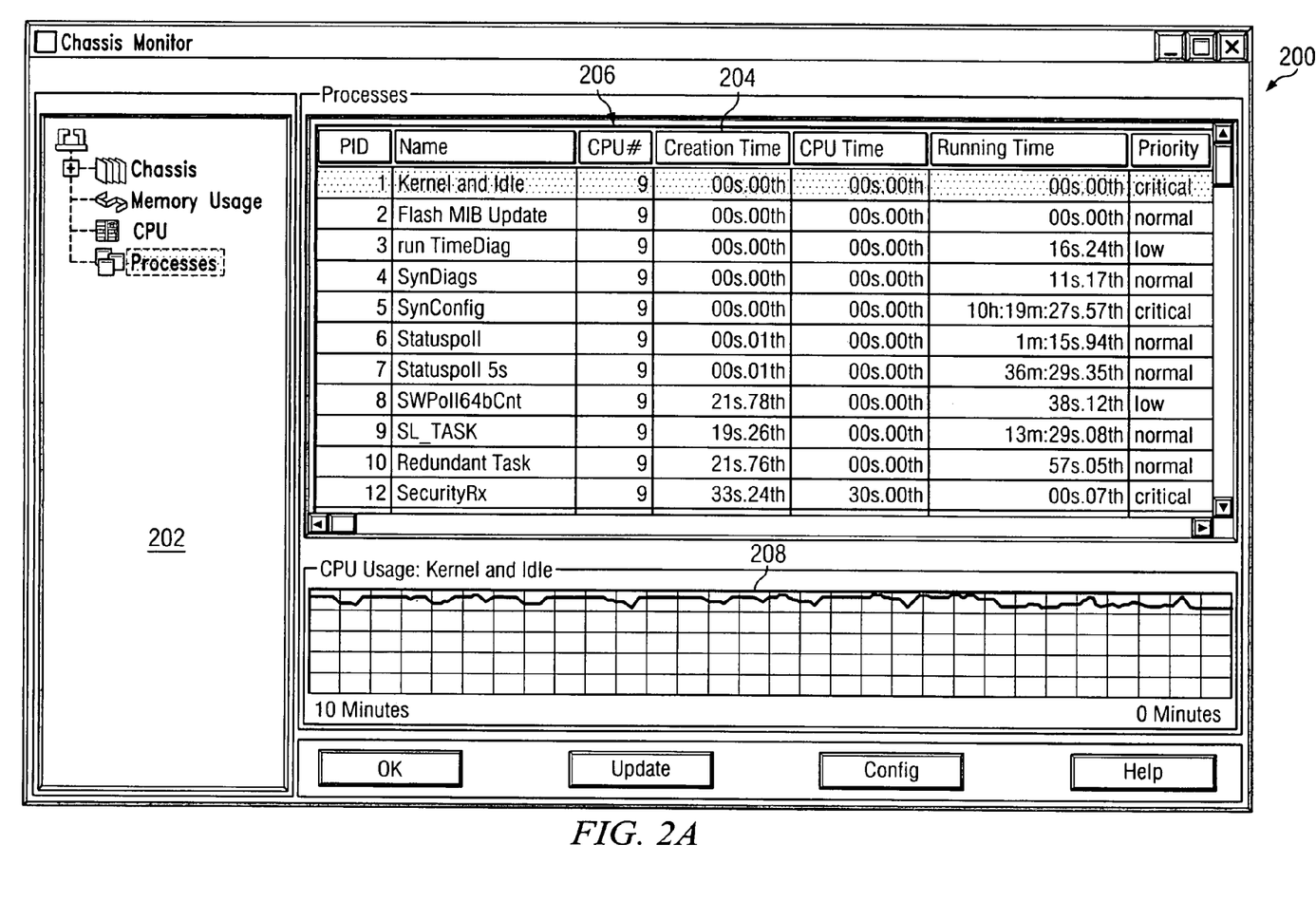

Chassis monitoring engine 138 presents display 200, which includes a tree 202 and a tree item field 204. Tree 202 illustrates a logical organization of data retrieved from the selected switch 124 and may provide standard tree processing, such as expanding and collapsing. Tree item field 204 provides a display of information associated with an item selected in tree 202. In one embodiment, a tree item is selected for display in tree item field 204 by using a mouse and clicking on the tree item displayed in tree 202. FIG. 2A illustrates one embodiment of display 200 including processing of the selected tree item in tree 202. In this embodiment, tree item field 204 includes process table 206 and process graph 208. Process table 206 includes a spreadsheet with several columns and rows, with each intersection comprising a cell. Each cell is populated with information associated with the selected switch 124 in network 112. In the illustrated embodiment, process table 206 includes seven columns: Process identifier (PID), name, CPU number, creation time, CPU time, running time, priority, allocated memory, freed memory, invoked times, and CPU usage. Each row illustrates a process currently running on the selected switch 124. As needed, a scroll bar may be used by a user to scroll between columns. Process graph 208 includes a real-time graph of CPU usage for a process selected from process table 206 as a function of time. In one embodiment, a process is selected for display by using a mouse and clicking on a process displayed in process table 206.

Figure 2B:
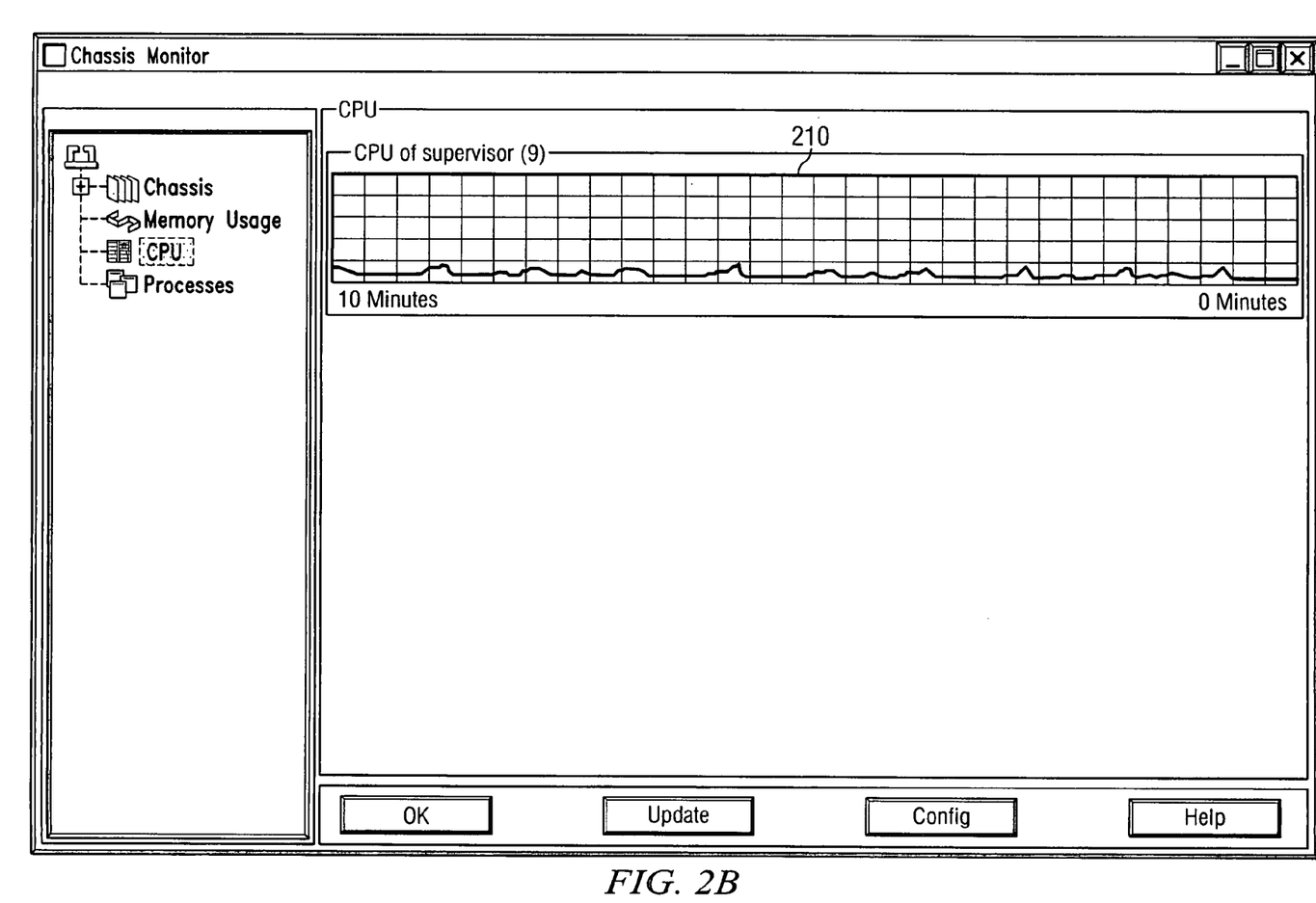

FIG. 2B illustrates another embodiment of display 200, as presented by chassis monitoring engine 138, including CPU as the selected tree item in tree 202. In this embodiment, tree item field 204 includes CPU usage graph 210. CPU usage graph 210 displays a real-time graph of CPU usage for the selected switch 124 as a function of time. In one embodiment, the horizontal axis represents a measurement of time from right to left. For example, the current time is labeled zero minutes on the right hand side and the charting time is labeled 10 minutes on the left hand side. Charting time is automatically calculated based on polling interval. Occasionally, the frame title is retrieved from the device MIB, which is the name of the CPU, and data points are retrieved from device MIB. User can't not manually change them. In another embodiment, the bottom of graph 210 may indicate a usage of 0% and the top of graph 210 may indicate a usage of 100%.

Figure 2C:
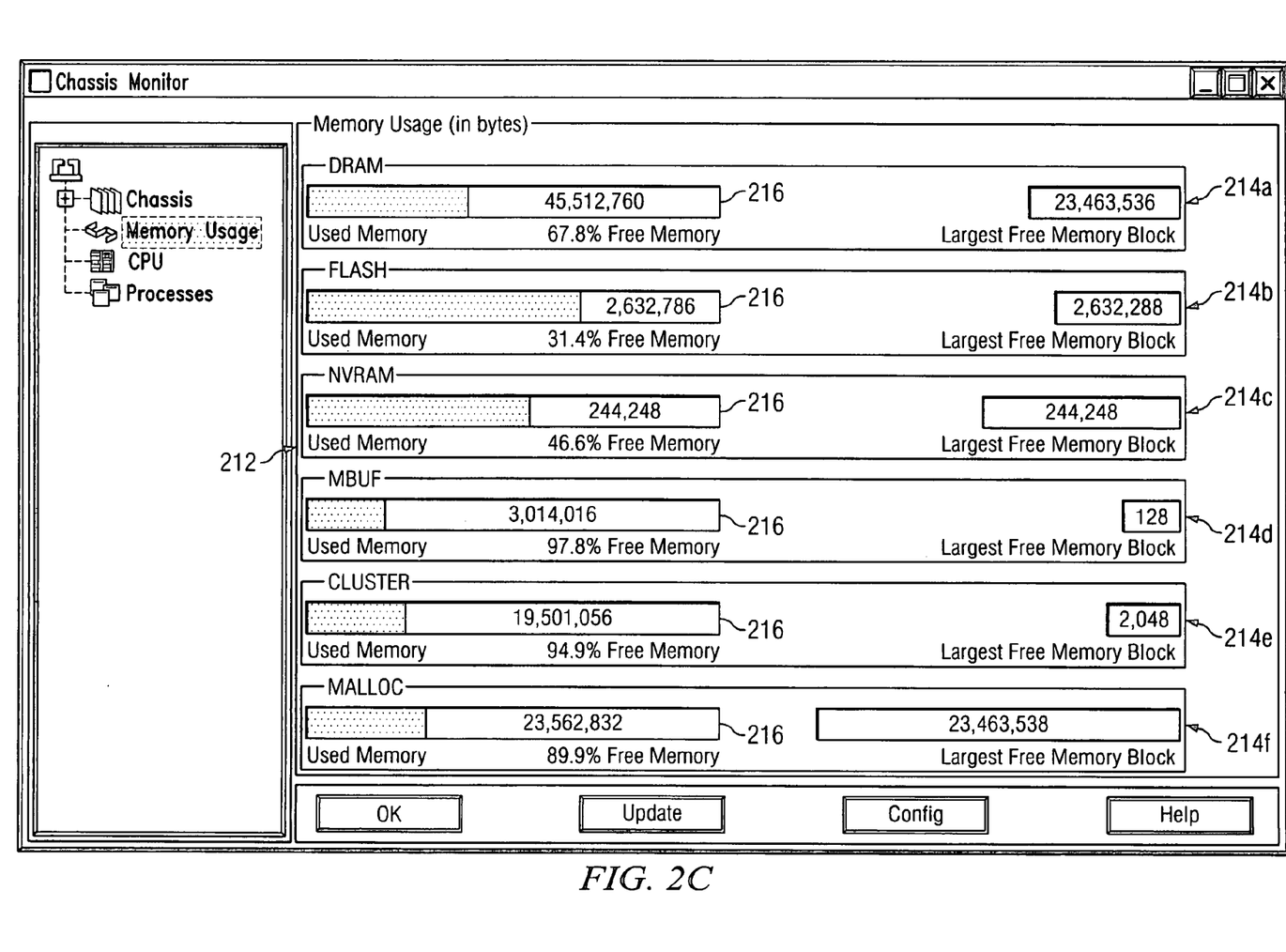

FIG. 2C illustrates one embodiment of display 200, as presented by chassis monitoring engine 138, including memory usage as the tree item selected in tree 202. In this embodiment, tree item field 204 includes memory usage frame 212 for monitoring real-time memory usage of the available memory pool of the selected switch 124. In the illustrated embodiment, memory usage frame 212 comprises several subframes, memory frames 214a-f displaying information associated with disparate memory types. Each memory frame 214 includes a title, memory usage bar 216, and a free memory bar 218. The title of each memory frame 214 typically includes a text indicating the memory type associated with the corresponding memory usage bar 216. In this embodiment, the displayed memory types include DRAM, FLASH, NVRAM, MBUF, CLUSTER, and MAL-LOC. Memory usage bar 216 graphically illustrates memory usage in bytes associated with the corresponding memory type indicated in the title of the corresponding frame 214 and may be proportionately divided between used and free memory. Each memory frame 214 may also include a percentage indicating the free memory available for the corresponding memory type. Free memory bar 218 graphically represents the largest free memory block available in the corresponding memory type and it may also be indicated in terms of bytes.

Figure 2D:
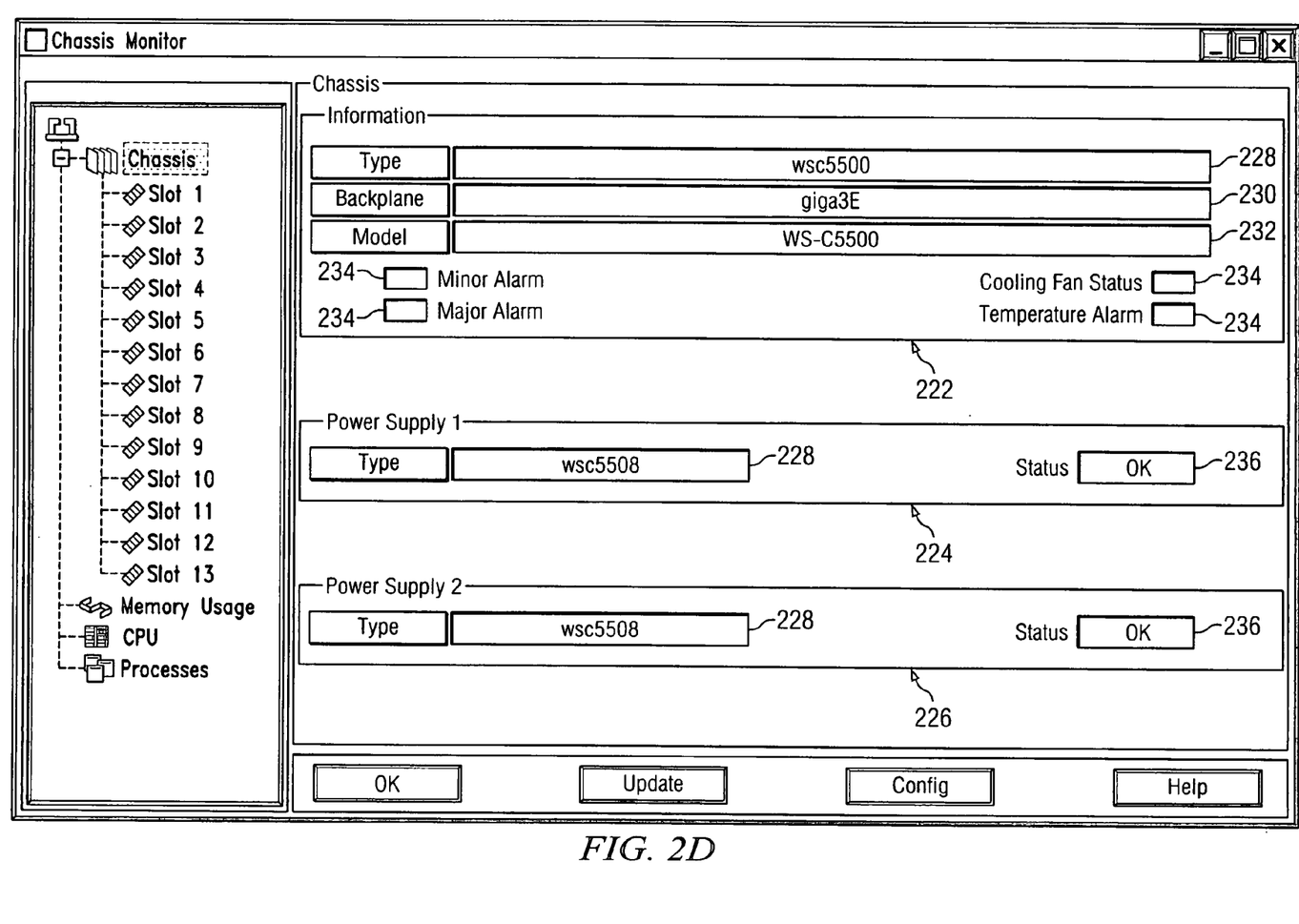

FIG. 2D illustrates yet another embodiment of display 200, as presented by chassis monitoring engine 138, including chassis as the tree item selected in tree 202. In this embodiment, tree item field 204 includes chassis information frame 220 for providing information associated with the selected switch 124. In the illustrated embodiment, chassis information frame 220 includes an information frame 222, power supply 1 frame 224, and power supply 2 frame 226. Information frame 220 may include a plurality of graphical LEDs 234, type field 228, backplane field 230, and model field 232. Type field 228 may indicate the type of the selected switch 124. Backplane field 230 may indicate the type of the backplane of the selected switch 124. Model field 232 may indicate the model number associated with the selected switch 124. Fields 228, 232, and 236 may display a raised label and a sunken display field. Additionally, the label may automatically resize to the width of the text if the text width is wider than the label field. The plurality of graphical LEDs 234 displayed in information frame 222 may indicate a minor alarm, major alarm, cooling fan status, temperature alarm, or any other suitable information associated with the chassis of the selected switch 124. Both power supply 1 frame 224 and power supply 2 frame 226 may include a type field 228 and a status LED 236. In one embodiment, status LED 236 is color-coded. Type field 228 in power supply 1 frame 224 and power supply 2 frame 226 may indicate the power supply types associated with the selected switch 124. Status LED 236 of both power supply frames may indicate whether the power supply is operating normally by indicating "OK" in status LED 236.

Figure 2E:
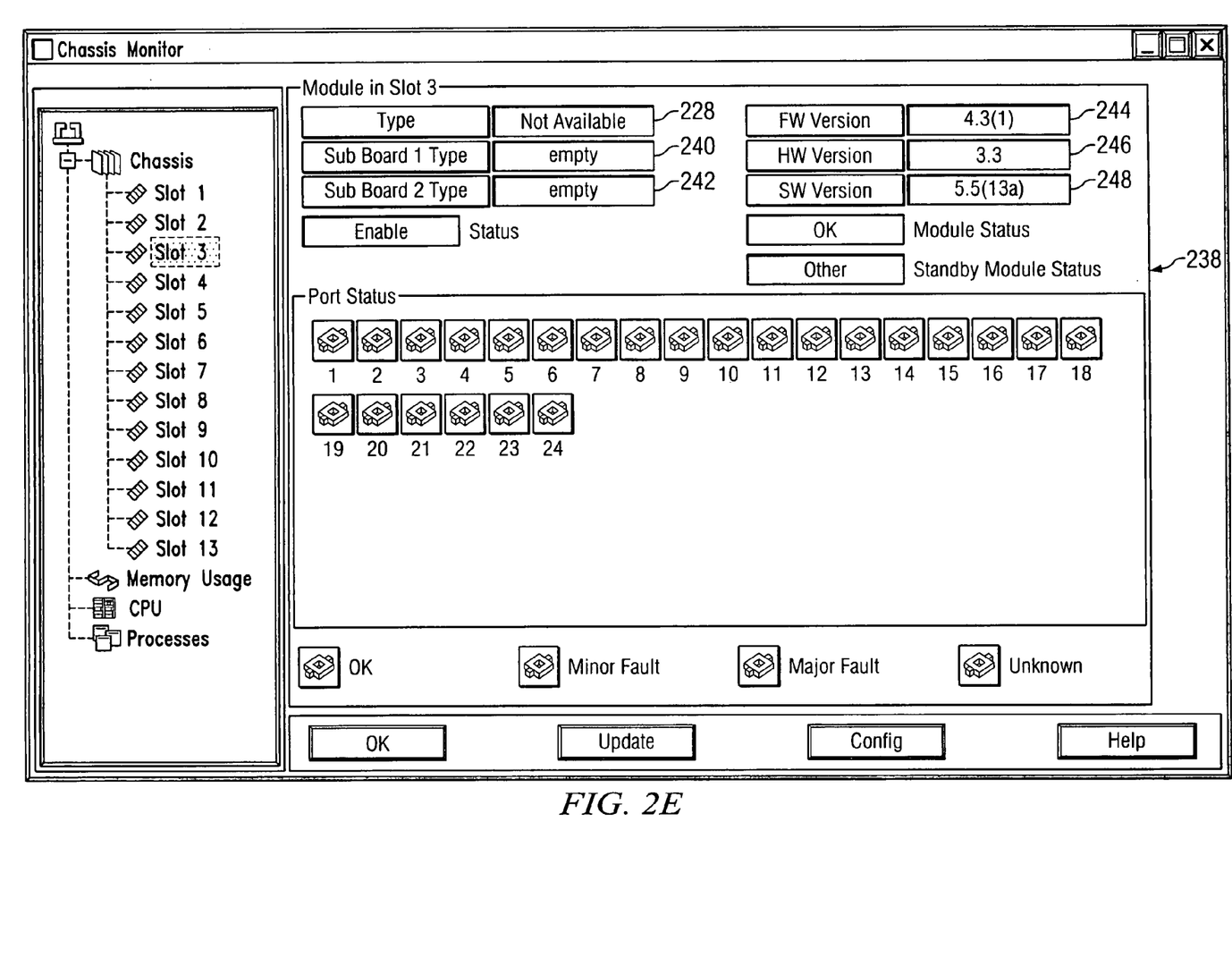

FIG. 2E illustrates another embodiment of display 200, as presented by chassis monitoring engine 138, including slot 3, a child of chassis, as the tree item selected in tree 202. In this embodiment, tree item field 204 includes module frame 238 for displaying information associated with a module card inserted in slot 3 of the selected switch 124. Module frame 238 may include type field 228, sub board 1 type field 240, sub board 2 type field 242, FW version field 244, HW version field 246, SW version field 248, a port status field 250, and several graphical LEDs. Type field 228 may display text indicating a module type. If a slot does not contain a module, type field 228 may indicate "Slot Empty." Sub board 1 and 2 fields 240 and 242, respectively, may indicate daughter board types. FW version field 244 may indicate a firmware version. HW version field 246 may indicate a hardware version. SW version field 248 may indicate a software version. Port status field 250 may indicate the port status of each port associated with the module card inserted in the selected slot 3. In one embodiment, a configured slot may be displayed in green, and an un-configured slot may be displayed in gray. In yet another embodiment, if there are more ports than can be displayed in port status field 250, a scrollbar may be displayed allowing a user to scroll through the ports.

It will be understood that exemplary display 200 illustrated in FIGS. 2A-E is for illustration purposes only and may include none, some, or all of the illustrated presentation elements as well as additional presentation elements not shown.

Figure 3:
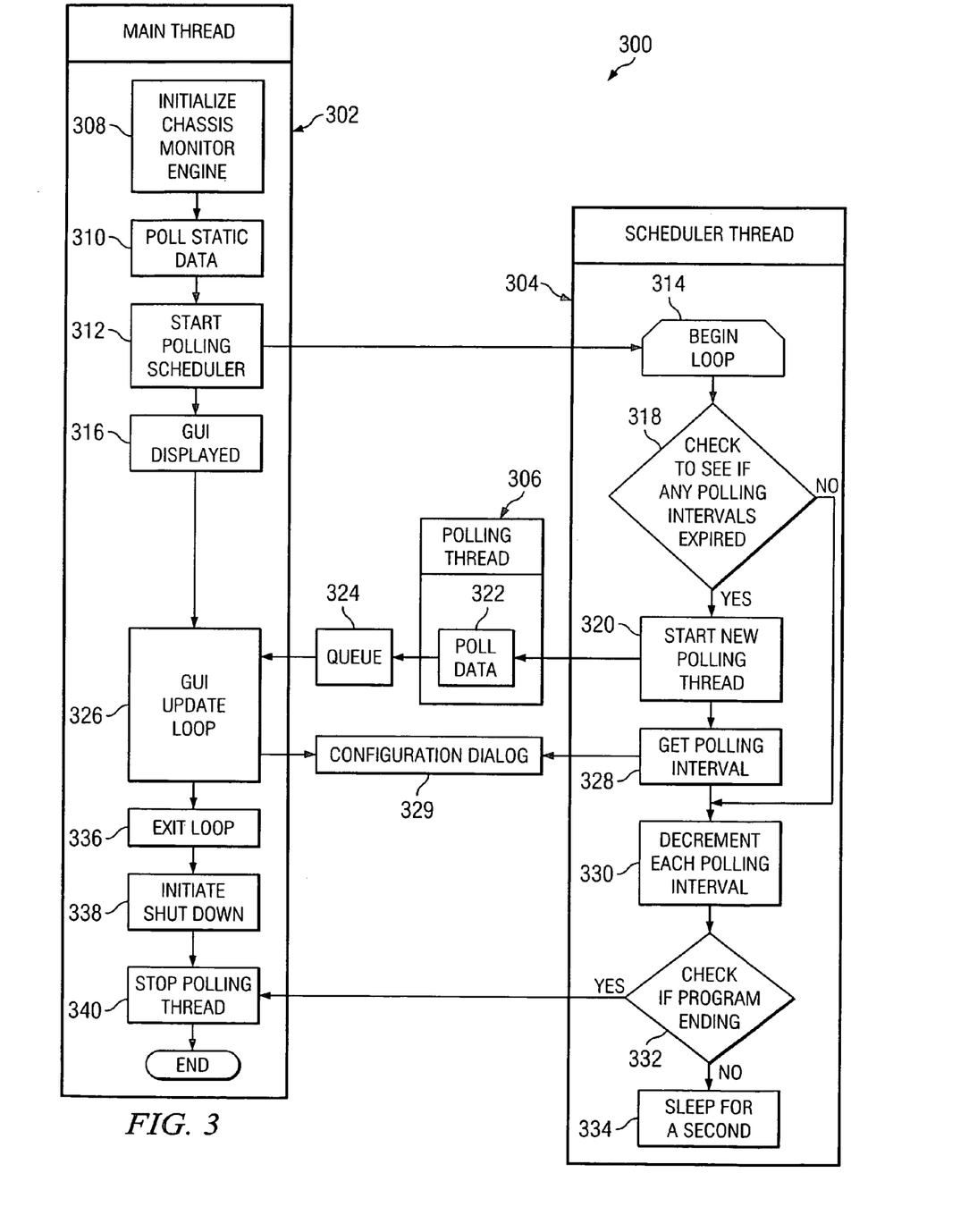

FIG. 3 is an exemplary flow diagram illustrating an example method 300 for monitoring a selected network device 118 according to one embodiment of this disclosure. Method 300 is described with respect to monitoring system 100 of FIG. 1, but method 300 could also be used by any other system. In the illustrated embodiment, method 300 comprises a main thread 302, a scheduler thread 304, and a polling thread 306; however, system 100 may use any other suitable technique for performing these tasks. Thus, many of the steps in this flowchart may take place simultaneously and/or in different orders than as shown. Moreover, system 100 may use methods with additional steps, fewer steps, and/or different steps, so long as the methods remain appropriate.

Method 300 begins at step 308 where a chassis monitoring engine 138 is initialized. During initialization, a user of computer 114 may input an IP address to select a network device 118 for monitoring. Alternatively, a user of computer 114 may select a network device 118 for monitoring by interacting with GUI 122. In one embodiment, chassis monitoring engine 138 displays a splash screen until chassis monitoring engine 138 successfully communicates with an SNMP agent on a selected network device 118. If chassis monitoring engine 138 is unable to communicate with the selected device 118, chassis monitoring engine 138 will terminate and display an error message to the user of monitoring computer 114 via GUI 122. Chassis monitoring engine 138 may also initialize a logger for maintaining error messages or a complete trace of the execution of chassis monitoring engine 138. Next, at step 310, chassis monitoring engine 138 polls the selected network device 118 to retrieve static or other suitable information associated with the selected network device 118. Once chassis monitoring engine 138 receives the requested data from the selected network device 118, the polling scheduler thread 304 is initialized at step 312. At step 316, chassis monitoring engine 138 displays the appropriate information through GUI 122 on monitoring computer 114.

Scheduler thread 304 typically drives the main execution of method 300. Upon creation, scheduler thread 304 may acquire a run mutex to substantially ensure that method 300 continues until scheduler thread 304 has terminated. Scheduler thread 304 begins at step 314. Scheduler thread 304 may create one thread for each polling option as illustrated in polling thread 306. Polling options may include chassis alarms, temperature status, fan status, power supply status, module status, process status, chassis CPU usage, process CPU usage, memory pull information, and other suitable information associated with the selected network device 118. At decisional step 318, chassis monitoring engine 138 determines if any polling intervals have expired. If a polling interval has expired, then, at step 320, chassis monitoring engine 138 executes a new polling thread 306 for the associated polling option. At step 322, chassis monitoring engine polls the selected device 118 for data and stores the data in queue 140 at step 324. At step 326, chassis monitoring engine 138 updates GUI 122 with the data stored in queue 140. A user of computer 114 may make changes to the polling intervals through GUI 122 at step 329. If changes are made, chassis monitoring engine 138 retrieves or receives those changes and updates polling configuration file 130. Based upon the changes, chassis monitoring engine 138 retrieves the polling interval associated with the recently polled polling option for scheduler thread 304 at step 328. If chassis monitoring engine 138 determines that no polling intervals have expired at step 318, then each polling interval is decremented, for example, by one second at step 330. If a user of monitoring computer 114 initiates a shut down of method 300, then at step 336 main thread 302 exits the loop between main thread 302 and scheduler 304. Chassis monitoring engine 138 initiates a shut down of the execution of method 300 at step 338. At step 340, main thread 302 indicates to scheduler 304 to stop polling thread 306 at which point processing ends. At decisional step 332, if the user indicates via GUI 122 that the monitoring session is substantially finished, then execution ends. If the user of chassis monitoring engine 138 has not indicated that the monitoring session is finished, then, at step 334, scheduler thread 304 sleeps for one second then begins again at step 314.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for monitoring hardware information associated with a plurality of distinct network devices in an enterprise system, comprising:

invoking a flexible configuration file, the flexible configuration file comprising a first location directive to retrieve parameters from a first network device and a second location directive to retrieve parameters from a second network device, the first network device comprising a first device type and the second network device comprising a second device type;

remotely retrieving real-time hardware information associated with (i) the first network device based on the first location directive and (ii) the second network device based on the second location directive, the hardware information including parameters related to one or more hardware characteristics of the first network device or the second network device, wherein remotely retrieving real-time hardware information associated with (i) the first network device based on the first location directive and (ii) the second network device based on the second location directive comprises polling the first network device and the second network device based on a polling configuration file, the polling configuration file comprising separate polling intervals for individual ones of the parameters related to hardware characteristics;

enabling selection, by a user, of the first network device or the second network device;

dynamically presenting the real-time hardware information associated with the selected network device through a display, the display comprising a first and a second window, the first window comprising a hierarchical tree structure of user-selectable hardware characteristics of the selected network device, the second window comprising a tabular display of information associated with a hardware characteristic selected by the user in the hierarchical tree structure of the first window.

2. The method of claim 1, wherein the hardware information comprises chassis component information.

3. The method the hardware characteristics being selected from the group consisting of:
    memory usage;
    chassis temperature;
    CPU usage;
    fan status;
    module card status; and
    power supply status.

4. An electronically readable storage medium, the medium comprising instructions that control one or more processors to:
    invoke a flexible configuration file, the flexible configuration file comprising a first location directive to retrieve parameters from a first network device and a second location directive to retrieve parameters from a second network device, the first network device comprising a first device type and the second network device comprising a second device type;
    remotely retrieve real-time hardware information associated with (i) the first network device based on the first location directive and (ii) the second network device based on the second location directive, the hardware information including parameters related to one or more hardware characteristics of the first network device or the second network device, wherein remotely retrieving the real-time hardware information comprises polling the first and second network devices based on a polling configuration file that specifies separate intervals for individual ones of the parameters related to the hardware characteristics; and
    dynamically present at least of a portion the real-time hardware information through a display.

5. The electronically readable medium of claim 4, the hardware information comprising chassis component information.

6. The electronically readable medium of claim 4, the hardware characteristics including at least one hardware characteristic selected from the group consisting of:
    memory usage;
    chassis temperature;
    CPU usage;
    fan status;
    module card status; and
    power supply status.

7. The electronically readable medium of claim 4, wherein the instructions further control the one or more processors to:
    enable a user to select the first network device or the second network device; and
    dynamically present the real-time hardware information associated with the selected network device through the display, the display comprising a first and a second window, the first window comprising a hierarchical tree structure of user-selectable hardware characteristics of the selected network device, the second window comprising a tabular display of information associated with a hardware characteristic selected by the user in the hierarchical tree structure.

8. A system for monitoring information associated with a plurality of distinct network devices in an enterprise system, comprising;
    memory storing a flexible configuration file, the flexible configuration file comprising a plurality of location directives, each directive associated with a MIB parameter for one of the network devices; and
    one or more processors collectively operable to:
        invoke a flexible configuration file, the flexible configuration file comprising a first location directive to retrieve parameters from a first network device and a second location directive to retrieve parameters from a second network device, the first network device comprising a first device type and the second network device comprising a second device type,
        remotely retrieve real-time hardware information associated with (i) the first network device based on the first location directive and (ii) the second network device based on the second location directive, the hardware information including parameters related to one or more hardware characteristics of the first network device or the second network device, wherein remotely retrieving the real-time hardware information comprises polling the first and second network devices based on a polling configuration file that specifies separate intervals for individual ones of the parameters related to the hardware characteristics; and
        dynamically present at least a portion of the real-time hardware information through a display.

9. The system of claim 8, the hardware information comprising chassis component information.

10. The system of claim 8, at least one of the hardware characteristics being selected from the group consisting of:
    memory usage;
    chassis temperature;
    CPU usage;
    fan status;
    module card status; and
    power supply status.

11. The system of claim 8, wherein the one or more processors are collectively operable to:
    enable a user to select the first network device or the second network device; and
    dynamically present the real-time hardware information associated with the selected network device through the display, the display comprising a first and a second window, the first window comprising a hierarchical tree structure of user-selectable hardware characteristics of the selected network device, the second window comprising a tabular display of information associated with a hardware characteristic selected by the user in the hierarchical tree structure of the first window.

12. A method for monitoring hardware information associated with a plurality of distinct network devices in an enterprise system, comprising:
    invoking a flexible configuration file, the flexible configuration file comprising a first location directive to retrieve parameters from a first network device and a second location directive to retrieve parameters from a second network device, the first network device comprising a first device type and the second network device comprising a second device type, remotely retrieving real-time hardware information associated with the first network device based on the first location directive, the hardware information including parameters related to one or more hardware characteristics, wherein remotely retrieving real-time hardware information associated with the first network device comprises polling the first network device based on a polling configuration file that specifies separate intervals for individual ones of the parameters related to the hardware characteristics;

remotely retrieving real-time hardware information associated with the second network device based on the second location directive, the hardware information including parameters related to one or more hardware characteristics, wherein remotely retrieving real-time hardware information associated with the second network device comprises polling the second network device based on a polling configuration file that specifies separate intervals for individual ones of the parameters related to the hardware characteristics;

dynamically displaying the at least a portion of the retrieved hardware information through a display.

13. The method of claim 12, the hardware information comprising chassis component information.

14. The method of claim 12, wherein at least one of the hardware characteristics are selected from the group consisting of:
- memory usage;
- chassis temperature;
- Central Processing Unit (CPU) usage;
- fan status;
- module card status; and
- power supply status.

15. The method of claim 12, further comprising enabling a user to select the first network device or the second network device, wherein the display comprises a first and a second window, the first window comprising a hierarchical tree structure of user-selectable hardware characteristics of the selected network device, the second window comprising a tabular display of information associated with a hardware characteristic selected by the user in the hierarchical tree structure.

* * * * *